United States Patent
Hedhli et al.

(10) Patent No.: US 6,780,935 B2
(45) Date of Patent: Aug. 24, 2004

(54) FLUOROPOLYMER RESINS CONTAINING IONIC OR IONIZABLE GROUPS AND PRODUCTS CONTAINING THE SAME

(75) Inventors: Lotfi Hedhli, King of Prussia, PA (US); Laurent Billon, King of Prussia, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 267 days.

(21) Appl. No.: 09/774,266

(22) Filed: Jan. 30, 2001

(65) Prior Publication Data

US 2003/0064267 A1 Apr. 3, 2003

Related U.S. Application Data

(60) Provisional application No. 60/182,732, filed on Feb. 15, 2000.

(51) Int. Cl.[7] .................................................. C08F 8/00
(52) U.S. Cl. .................. 525/191; 525/197; 525/199; 525/221; 525/222; 525/212; 525/287
(58) Field of Search ................. 525/191, 197, 525/199, 221, 222, 212, 287

(56) References Cited

U.S. PATENT DOCUMENTS

| | | |
|---|---|---|
| 3,051,677 A | 8/1962 | Rexford |
| 3,178,399 A | 4/1965 | Lo |
| 3,475,396 A | 10/1969 | McCain et al. |
| 3,857,827 A | 12/1974 | Dohany |
| 4,039,634 A | 8/1977 | Couchoud .................... 260/895 |
| 4,295,952 A | 10/1981 | De Nora et al. |
| 4,569,978 A | 2/1986 | Barber ........................ 526/206 |
| 5,093,427 A | 3/1992 | Barber |
| 5,272,186 A | 12/1993 | Jones |
| 5,510,160 A | 4/1996 | Jadamus et al. .......... 428/36.91 |
| 5,540,837 A * | 7/1996 | Lunkwitz et al. ............ 210/490 |
| 5,554,426 A * | 9/1996 | Röber et al. .............. 428/36.91 |
| 5,679,482 A | 10/1997 | Ehrenberg et al. |
| 5,795,668 A | 8/1998 | Banerjee |
| 5,880,204 A | 3/1999 | McCarthy |
| 5,962,140 A | 10/1999 | Rajagopalan |

FOREIGN PATENT DOCUMENTS

| | | | |
|---|---|---|---|
| EP | 0029316 | 5/1981 | ........... C08L/27/08 |
| WO | WO 97/41168 | 11/1997 | |
| WO | WO 98/20573 | 5/1998 | |
| WO | WO 98/22989 | * 5/1998 | |

OTHER PUBLICATIONS

International Search Report from PCT/US 01/04995 dated May 9, 2001.

* cited by examiner

*Primary Examiner*—William Cheung
(74) *Attorney, Agent, or Firm*—Kilyk & Bowersox, P.L.L.C.

(57) ABSTRACT

A polymer blend is described which contains at least one acrylic resin or vinyl resin having at least one ionic or ionizable group and at least one thermoplastic fluoropolymer. Preferably, the polymer blend is an intimate blend of the two polymers which are useful in a variety of applications including in the formation of a membrane which is useful in batteries and fuel cells and the like. Methods of making the polymer blends are also described.

13 Claims, No Drawings

FLUOROPOLYMER RESINS CONTAINING IONIC OR IONIZABLE GROUPS AND PRODUCTS CONTAINING THE SAME

This application claims the benefit under 35 U.S.C. § 119(e) of prior U.S. Provisional Patent Application No. 60/182,732 filed Feb. 15, 2000, which is incorporated in its entirety by reference herein.

BACKGROUND OF THE INVENTION

The present invention relates to polymeric resins and more specifically to polymeric resins containing ionic and/or ionizable groups which are useful in a variety of products such as polyelectrolyte membranes and other thermoplastic articles. The present invention further relates to methods of making these resins as well as using these resins.

Perfluorocarbon ionic exchange membranes provide high cation transport, and have been extensively used as ionic exchange membranes. Polymeric ion exchange membranes can be referred to as solid polymer electrolytes or polymer exchange membranes (PEM). The most commonly used membranes, and commercially available, are made from Nafion™ and Aciplex™ polymers. However, reports and literature describe these membranes as working well with gaseous fuels but not with liquid fuels which may be mainly due to fuel crossover that diminishes cell performance. A membrane's chemical resistance and mechanical strength are important properties for fuel cell applications. Indeed, the membrane is often subjected to high differential pressure as well as other conditions. Also, mechanical strength becomes important when the membrane is very thin such as less than 100 microns. Further, when used with fuels or battery applications, the membrane sits in a very acidic medium at temperatures that can reach 150° C. and in the presence of metal ions and solvents. This environment requires that the membrane be chemically resistant.

Currently, many fluorine-containing membranes can suffer from one or more of the following short comings:
i) high liquid crossover through the membrane;
ii) heterogeneous blending between the fluorinated polymer and other polymers that leads to inferior properties;
iii) insufficient chemical resistance in the presence of liquid fuels;
iv) the need for high sulfonation levels to function properly;
v) lack of heterogeneous distribution of sulfonated groups; and/or
vi) poor mechanical properties.

U.S. Pat. No. 4,295,952 to de Nora et al. relates to cationic membranes which have partly sulfonated tripolymers of styrene, divinylbenzene, and at least one of 2-vinylpyridine, 4-vinylpyridine, and/or acrylic acid.

U.S. Pat. No. 5,679,482 to Ehrenberg et al. relates to fuel cells incorporating an ion-conducting membrane having ionic groups. The polymer forming the membrane contains styrene which has been sulfonated using a sulfonation agent. The sulfonation can take place with the monomer or polymer.

U.S. Pat. No. 5,795,668 describes a fuel cell containing a battery with a reinforced polymeric ion exchange membrane (PEM) using Nafion™ type polymers. The PEM is based on a fluorinated porous support layer and a reinforced ion exchange membrane with an equivalent weight of about 500 to 2000 and a preferred ion exchange capacity of from 0.5 to 2 meq/g dry resin. The porous support layer is made of certain PTFE and PTFE copolymers. The membrane is a perfluorinated polymer with side chains containing—$CF_2$ $CF_2$ $SO_2F$. It is known from the literature that Nafion® type polymers can have mechanical failure in methanol fuel cells as well as problems with liquid crossover.

WO 97/41168 to Rusch relates to a multi-layered ion-exchange composite membrane having ionic exchange resins, such as fluorinated or non-fluorinated polystyrene based sulfonates and sulfonated polytetrafluoroethylenes.

WO 98/20573 A1 describes a fuel cell containing a highly fluorinated lithium ion exchange polymer electrolyte membrane (PEM). The PEM is based on an ion exchange membrane which is imbibed with an aprotic solvent.

WO 98/22989 describes a polymeric membrane containing polystyrene sulfonic acid and poly(vinylidene fluoride), which provides reduced methanol crossover in direct methanol fuel cell (DMFC) use. However, the polymer blending process described does not provide an acceptable blend and the sulfonation steps are complicated.

Holmberg et al., (J. Material Chem. (1996 6(8), 1309) describes the preparation of proton conducting membranes by irradiation grafting of styrene onto PVDF films, followed by sulfonation with chlorosulfonic acid. In the present invention, a sulfonation step is not required since the sulfonated group can be incorporated using a sulfonated monomer.

Thus, there is a need to overcome one or more of these limits and to develop a membrane that can be used for applications in liquid fuel cells. More particularly, there is a need to develop a fluoropolymer which is more intimately mixed with other polymers as well as to make membranes directly from aqueous dispersions of fluoropolymers. Also, there is a need to provide compositions and methods of synthesis as well as methods of using water dispersions of fluoropolymers having sulfonated or other functionalities. Further, there is a need to provide a method that is easier and environmentally friendly. In addition, those skilled in the art would prefer a polyelectrolyte membrane having a higher chemical resistance and mechanical strength.

SUMMARY OF THE INVENTION

Accordingly, a feature of the present invention is to provide fluoropolymers, having ionic functionalities.

Another feature of the present invention is to provide a polyelectrolyte membrane having high chemical resistance and/or mechanical strength.

Another feature of the present invention is to provide polymers which can be formed as a component in polyelectrolyte membranes which avoid one or more of the short comings described above, such as avoiding a high liquid crossover through the membrane.

Another feature of the present invention is to provide membranes which can be made directly from an aqueous dispersion of a polymer.

Another feature of the present invention is to provide fluoropolymers having ionic or ionizable groups without separate sulfonation steps.

Additional features and advantages of the present invention will be set forth in part in the description which follows, and in part will be apparent from the description, or may be learned by practice of the present invention. The objectives and other advantages of the present invention will be realized and obtained by means of the elements in combination and particularly pointed out in the written description and appended claims.

To achieve these and other advantages and in accordance with the purpose of the present invention, as embodied and broadly described herein, the present invention relates to a polymer blend containing at least one acrylic resin and/or vinyl resin and at least one thermoplastic fluoropolymer, wherein the acrylic and/or vinyl resin has at least one ionic or ionizable group, such as a sulfonated group.

The present invention also relates to a composition that includes the polymer product of blending: a) at least one polymer having acrylic and/or vinyl units and at least one ionic or ionizable group; and b) at least one thermoplastic fluoropolymer, wherein a) and b) are different.

The present invention further relates to a composition comprising the polymer product of a) at least one polymerizable acrylic and/or vinyl containing monomer(s) and at least one monomer comprising at least one ionic or ionizable group, or both; b) in the presence of a dispersion of at least one fluoropolymer capable of dispersing in a medium.

Also, the present invention relates to a preferred method of making the above-described compositions, involving the steps: a) conducting a seed emulsion polymerization of at least one polymerizable acrylic and/or vinyl containing monomer and at least one monomer containing at least one ionic or ionizable group in a dispersion of at least one polymer capable of dispersing in a medium.

The present invention also relates to blending a) at least one polymer having acrylic and/or vinyl units and at least one ionic or ionizable group; and b) at least one thermoplastic fluoropolymer, wherein a) and b) are different.

The present invention further relates to a polymeric ion exchange membrane containing the compositions of the present invention and also relates to a fuel cell and battery containing the membrane of the present invention.

In addition, the present invention relates to a membrane electrode assembly including the above-mentioned membrane, and relates to a fuel cell using this membrane electrode assembly.

It is to be understood that both the foregoing general description and the following detailed description are exemplary and explanatory only and are intended to provide a further explanation of the present invention as claimed.

DETAILED DESCRIPTION OF THE PRESENT INVENTION

The present invention relates to a polymer blend which contains at least one fluoropolymer and at least one acrylic and/or vinyl resin or polymer which bears at least one ionic or ionizable group, such as a sulfonated and/or phosphonated group.

The compositions of the present invention can also be characterized as the resulting product from blending a) at least one polymer having acrylic or vinyl units or both and at least one ionic or ionizable group and b) at least one thermoplastic fluoropolymer, wherein a) and b) are different from one another.

The present invention also relates to a composition comprising the polymer product of a) at least one polymerizable vinyl and/or acrylic containing monomer and at least one monomer comprising at least one ionic or ionizable group or both wherein the polymerization occurs in the presence of a dispersion of at least one fluoropolymer capable of dispersing in a medium.

The polymer blend of the present invention can be any type of mixture of the two polymers described above and throughout this application. Preferably, the polymer blend is an intimate blend of the two polymers. For instance, the polymer blend can be a polymer blend wherein one of the polymers at least partially coats onto the other polymer. Preferably, the fluoropolymer is coated by the acrylic or vinyl resin or the polymer formed from at least one polymerized vinyl or acrylic containing monomer and at least one monomer comprising at least one ionic or ionizable group or both is the shell. As stated earlier, the acrylic or vinyl resin can partially coat or fully coat the fluoropolymer in the preferred embodiment. Preferably, the attachment between the acrylic resin and the fluoropolymer is a physical attachment though attachments other than physical attachments are within the bounds of the present invention including chemical attachments. In the preferred embodiment, the particle typically has a particle size of from about 90 to about 500 nm, and more preferably from about 50 to about 300 nm, wherein the amount of fluoropolymer is from about 5 to about 95 weight % and the amount of the acrylic or vinyl resin is from about 95 to about 5 weight %. Preferably, the fluoropolymer is present in an amount of from about 40% to about 80 weight % and the amount of acrylic or vinyl resin is from about 20 to about 60 weight %.

With respect to the fluoropolymer, this fluoropolymer can be a homopolymer or other type of polymer, and can be a mixture of fluoropolymers or a mixture of fluoropolymer with a non-fluoropolymer. Preferably, a thermoplastic fluoropolymer is used. Preferably, this fluoropolymer or mixtures of fluoropolymers can be any fluoropolymer(s) which can form a polymer blend with the other components, including other polymers present. Preferably, the fluoropolymer is a poly(vinylidene fluoride) polymer such as a poly(vinylidene fluoride) homopolymer. Other examples of fluoropolymers include, but are not limited to, a poly(alkylene) containing at least one fluorine atom, such as polyhexafluoropropylene, polytetrafluoroethylene, poly(vinyl fluoride), or combinations thereof. More preferably, the fluoropolymer is a polymeric composition containing from about 30% to about 100 weight % of vinylidene fluoride and from 0% to about 70 weight % of at least one poly(alkylene) containing at least one fluorine atom, such as, hexafluoropropylene, tetrafluoroethylene, trifluoroethylene (VF3), chlorotrifluoroethylene, and/or vinyl fluoride. Preferably, the molecular weight of the fluoropolymer which can include homopolymers, copolymers, terpolymers, oligomers, and other types of polymers is from about 80,000 MW to about 700,000 MW and, more preferably from about 100,000 MW to about 500,000 MW. The fluoropolymers can be prepared using the techniques described in U.S. Pat. Nos. 3,051,677; 3,178,399; 3,475,396; 3,857,827; and 5,093,427, all incorporated herein in their entirety by reference.

With respect to the acrylic resin or polymer, this polymer or resin preferably contains or bears one or more ionic or ionizable groups. Examples of acrylic resins include polymers (including copolymers, terpolymers, oligomers, and the like) of acrylic acids, methacrylic acids, esters of these acids, or acrylonitrile. Acrylic resins can be formed from polymerizable vinyl containing monomers, including, but not limited to, acrylic acid alkyl esters, methacrylic acid alkyl esters, and the like. The acrylic resin can also contain other repeating units as well as combinations of different acrylic acid alkyl esters, methacrylic acid alkyl esters, acrylic acids, methacrylic acids, and acrylonitriles. For purposes of the present invention, the acrylic resin can include other polymerized monomers or can be a mixture of two or more different acrylic resins or can additionally include non-acrylic resins, such vinyl monomers and styrenic monomers.

Furthermore, the acrylic resin contains at least one ionic (e.g., sulfonate or phosphonate) or ionizable group such as a sulfonated or phosphonated group or sulfonyl groups. An ionizable group is a group capable of forming an ionic group, such as cyclic amino acids, sultones, maleic anhydride, mercaptans, sulfides, phosphalanes, and the like. These groups can be part of the acrylic resin by any means such as blending an acrylic resin in the presence of one or more monomers containing an ionic or ionizable group. In the alternative, one or more of the monomers used to form the acrylic resin can contain the ionic or ionizable group.

Besides the components mentioned above with respect to the acrylic resin, the acrylic resin can further contain or be formed in the additional presence of one or more additional monomers optionally with any type of functional group as long as these monomers are compatible with the overall formation of the acrylic resin.

As stated earlier, preferably the acrylic resin is the result of the polymerization of several monomers, one of which contains the ionic or ionizable group, and the other which contains the acrylic units of the acrylic resin. More preferably, the acrylic resin is formed from polymerizing (1) acrylic acid alkyl esters, (2) methacrylic acid alkyl esters, (3) one or more co-polymerizable monomers which are different from (1) and (2), (4) one or more monomers having at least one functional group, (5) a monomer containing ionic or ionizable groups, such as a sulfonated or phosphonated monomer.

Examples of the acrylic acid ester (1) include, for example, ethyl acrylate, methyl acrylate, butyl acrylate, propyl acrylate, isobutyl acrylate, amyl acrylate, 2-ethylhexyl acrylate, hexyl acrylate, fluoroalkyl acrylates, and combinations thereof.

Examples of the methacrylic acid ester (2) include, for example, ethyl methacrylate, methyl methacrylate, butyl methacrylate, propyl methacrylate, isobutyl methacrylate, amyl methacrylate, 2-ethylhexyl methacrylate, hexyl methacrylate, fluoroalkylmethacrylate, and combinations thereof.

Examples of the copolymerizable monomers (3) include, for example, conjugated dienes (e.g., 1,3-butadiene, isoprene), aromatic alkenyl compounds (e.g., styrene, αmethylstyrene, styrene halides), divinyl hydrocarbon compounds (e.g., divinyl benzene), and combinations thereof.

Examples of the functional monomer (4) include, but are not limited to, α, β unsaturated carboxylic acids (e.g., acrylic acid, methacrylic acid, fumaric acid, crotonic acid, itaconic acid); vinyl ester compounds, amide compounds (e.g., acrylamide, methacrylamide, N-methylmethacrylamide, N-methylolmethacrylamide, N-alkylacrylamide, N-alkylacryl methamide, N-dialkyl methacrylamide, N-dialkyl acrylamide); monomers containing hydroxyl group (e.g., hydroxyethyl methacrylate, hydroxyethyl acrylate, hydroxypropyl acrylate, hydroxypropyl methacrylate, diethylene glycol ethyl ether acrylate); monomers containing epoxy groups (e.g., glycidyl acrylate, glycidyl methacrylate), monomers containing silanols (e.g., γtrimethoxysilane methacrylate, γtriethoxysilane methacrylate); monomer containing aldehydes (e.g., acrolein), alkenyl cyanides (e.g., acrylonitrile, methacrylonitrile). The monomers included in (4) can be capable of crosslinking. Examples of copolymerizable monomers capable of crosslinking include isobutyl methacrylamide, glycidyl methacrylate, diethylene glycol dimethacrylate, and trimethyloxysilane methacrylate. Crosslinking might be desirable for improved mechanical properties and solvent resistance.

For some specific applications, low molecular weight copolymerizable polymers or oligomers can be used.

Moreover, when a mixture of acrylic acid alkyl ester (1) and methacrylic acid alkyl ester (2) is used, their ratio could be suitably adjusted to achieve the desired properties.

Examples of the monomer containing at least one ionic or ionizable group (5) include, but are not limited to, sulfopropyl acrylamide, vinyl sulfonic acid, sulfopropyl methacrylate, sulfoethyl methacrylate. These monomers can preferably be used either in their acid form or as a salt derivative. For example, in a seeded emulsion polymerization, the sulfonated monomer can be incorporated in either the first stage or the second stage or both stages. The amount of the ionic group is preferably from about 500 to about 2500 EW, and more preferably from about 800 to about 1100 EW, wherein EW is equivalent weight and is the number of grams of polymer per sulfonated unit.

The polymerization of the mixture of polymerizable vinyl and/or acrylic containing monomers can be carried out separately and then blended with the fluoropolymer(s), or polymerized in the presence of the fluoropolymer. The polymerization of the vinyl and/or acrylic containing monomers can be prepared by solution, bulk, emulsion polymerizations, or any other known polymerization methods.

If the polymerization of the mixture of polymerizable vinyl and/or acrylic ionic containing polymer is carried out separately, and then blended with the fluoropolymer, the blending can be carried out through various conventional ways including, but not limited to, solution blending, extrusion blending, latex blending, and the like. For solution blending, the polymer can be dissolved or dispersed in a solvent. The solvent used for the fluoropolymer can be similar or different than the solvent used for the acrylic/vinyl polymer. For example, the blending could involve two solvent solutions/dispersions, or a powder added to a solvent solution/dispersion, or the two polymers in the same solvent, or any other combination. Typical solvents used include tetrahydrofurane, acetone, dimethylsulfoxide, dimethylformamide, N-methyl pyrrolidinone. For melt extrusion blending, typical extrusion temperatures range between about 100° C. to about 300° C., preferably from about 150° C. to about 250° C. The material could be extruded such as in the shape of pellets or films. For the case of latex blending, the mixing can take place under various conventional ways: the acrylic/vinyl latex can be mixed with the fluoropolymer latex, or the acrylic/vinyl polymer can be dispersed or dissolved in the fluoropolymer latex, or any other known mixing. The mixing could involve more than two latexes. The quantity and nature of each latex is adjusted in such a way that the physical and chemical properties expected are obtained, and the expected EW is obtained. In the case of a waterborne membrane (e.g., prepared by direct latex case) the particle size and solids content of one or more latexes can be tailored to the desired properties.

As stated earlier, the compositions of the present invention are preferably formed by a seed polymerization. The seed polymerization can be carried out under the same conditions as for conventional emulsion polymerizations. A surfactant, a polymerization initiator, a chain transfer agent, a pH regulator, and eventually a solvent and a chelating agent, are preferably added to the seed latex, and the reaction is carried out under suitable reaction conditions of sufficient pressure, temperature, and time, such as under atmospheric pressure, from about 0.5 to about 6 hours at temperatures typically of from about 20 to about 150° C., more preferably from about 40 to about 80° C.

The emulsion polymerization using the fluoropolymer as a seed can be performed according to standard methods:

batch polymerization using the monomer dispersion from the beginning; semi-continuous polymerization, wherein part of the monomer mixture is fed continuously or in batches; and continuous polymerization wherein the monomer mixture is fed continuously or in batches in the aqueous fluoropolymer dispersion during the reaction.

The surfactant can be anionic, cationic, and/or non-ionic surfactants, and/or amphoteric surfactants. The surfactant can be used separately or in combination with two or more. Examples of the anionic surfactant include esters of higher alcohol sulfates (e.g., sodium salts, of alkyl sulfonic acids, sodium salts of alkyl benzenesulfonic acids, sodium salts of succinic acids, sodium salts of succinic acid dialkyl ester sulfonic acids, sodium salts of alkyl diphenylether disulfonic acids). Examples of the cationic surfactant include an alkyl pyridinium chloride or an alkylammonium chloride. Examples of the non-ionic surfactant include polyoxyethylene alkylphenyl ethers, polyoxyethylene alkyl esters, polyoxyethylene alkyl esters, polyoxyethylene alkylphenyl esters, glycerol esters, sorbitan alkylesters, and derivatives thereof. Examples of the amphoteric surfactant include lauryl betaine. Reactive emulsifiers, which are able to copolymerize with the above-mentioned monomers, can also be used (e.g., sodium styrene sulfonate, sodium alkylsulfonate, sodium aryl alkylsulfonate and the like). The amount of surfactant usually used is from about 0.05 to about 5 parts by weight per 100 parts by weight of total fluoropolymer particles, though other amounts can be used.

Any kind of initiator which produces radicals suitable for free radical polymerization in aqueous media, preferably for temperatures from about 20 to about 100° C., can be used as the polymerization initiator. They can be used alone or in combination with a reducing agent (e.g., sodium hydrogenobisulfite, sodium thiosulfate, sodium hydrogenosulfite). For example, persulfates and hydrogen peroxide can be used as water-soluble initiators, and cumene hydroperoxide, diisopropyl peroxy carbonate, benzoyl peroxide, 2,2' azobis methylbutanenitrile, 2,2'-azobisisobutyronitrile, 1,1'azobiscyclohexane-1-carbonitrile, isopropylbenzenehydroperoxide can be used as oil-soluble initiators. Preferred initiators include 2,2'azobis methylbutanenitrile and 1,1'azobiscyclohexane-1-carbonitrile. The oil-soluble initiator is preferably dissolved in the monomer mixture or in a small quantity of solvent. The amount of initiator used is preferably from about 0.1 to about 2 parts by weight per 100 parts by weight of the monomer mixture added.

Any suitable type of chain transfer agents can be used, and preferably one that does not considerably slow down the reaction. The chain transfer agents that can be used include, for example, mercaptans (e.g., dodecyl mercaptan, octylmercaptan), halogenated hydrocarbon (e.g., carbon tetrachloride, chloroform), xanthogen (e.g., dimethylxanthogen disulfide), and the like. The quantity of chain transfer agent used is usually from about 0 to about 5 parts by weight per 100 parts by weight of the monomer mixture added.

A small quantity of solvent can be added during the reaction in order to help the seed particle swelling by the monomer (and therefore, increase the mixing at a molecular level) and improve film formation. The quantity of solvent added should be in such ranges that workability, environmental safety, production safety, and/or fire hazard prevention are not impaired. The solvents used include for example, acetone, methylethyl ketone, N-methyl pyrrolidone, toluene, dimethylsulfoxide, and the like.

One advantage of the present invention is the introduction of at least one ionic or ionizable moiety, such as a sulfonated moiety, to the fluoropolymer by copolymerization of a monomer containing the ionic or ionizable group, optionally with other monomers, in the presence of a fluoropolymer aqueous dispersion. Consequently, in the present invention, the ionic or ionizable functionality is chemically bonded to the polymer chain via polymerization thus avoiding grafting techniques.

In addition, the present invention permits an intimate blending of two or more polymers in the aqueous dispersion, preferably through the use of the seeded polymerization method. Accordingly, the resulting resin is an intimate blend of at least one fluoropolymer and at least one polymer bearing the ionic or ionizable group. Thus, the need for grafting techniques can be avoided as well as the need to use environmentally unfriendly solvent solutions. Moreover, there is no need for post-sulfonation of the resin using acids such as sulfuric and sulfonic acids or derivatives thereof, since the ionic or ionizable group, e.g., the sulfonated group, is already on the monomer. Furthermore, because the ionic or ionizable group on the monomer is preferably polymerized, its distribution along the polymer chain is easily controlled by conventional means known in the art such as shot addition, continuous feed, late addition, and the like. Consequently, the resulting ionic or ionizable group distribution in a membrane formed from the polymer blend can be more easily controlled than previously. Accordingly, the tailoring of various properties, such as homogeneous, random, heterogeneous, and the like, can be achieved.

Furthermore, due to these various advantages described above, the applications of the present invention can include, but are not limited to, membranes, fuel cells, coatings, ion exchange resins, oil recovery, biological membranes, batteries, and the like.

A polymeric ion membrane can be made from the polymer blends of the present invention. The polymeric ion membrane can be prepared from conventional film preparation methods, such as melt extrusion, solvent cast, latex cast, and the like. Membrane electrode assemblies can be made from the membranes of the present invention and fuel cells using this membrane electrode assembly can be prepared.

In more detail, the compositions of the present invention are especially useful in fuel cells, batteries, and the like. The design and components used in the fuel cell and batteries would be the same as in conventional fuel cells and batteries except using the compositions of the present invention in the formation of the polymeric ionic exchange membrane. Accordingly, the designs and manners of making the fuel cells and batteries as described in U.S. Pat. No. 5,795,668 and PCT Publication No. WO 98/22989 as well as WO 98/20573 can be used in the present invention and are fully incorporated herein in their entireties by reference. The membrane can be used alone or with conventional fillers, such as silica and the like. The fuel cell may use a liquid or gaseous fuel such as a liquid hydrocarbon like methanol. The fuel cell of the present invention is capable of operating at a wide range of operating conditions. The fuel cell of the present invention can have a porous support layer and an ion exchange resin wherein the ion exchange resin is supported on at least one side of the porous support layer. The present invention can be useful in direct methanol fuel cells or other fuel cells. Preferably, the fuel cells of the present invention have low fuel crossover, high electric conductivity, and/or high mechanical strength. Thickness of the membrane can be conventional but is preferably from about 1 to about 10 mils and more preferably from about 3 mils to about 5 mils. Further, the membrane preferably has an equivalent weight of from about 500 to about 2500, and more preferably about 800 to about 1100. The porous support layer can be made from any conventional material such as a fluoro-containing polymer or other hydrocarbon containing polymers such as polyolefin. The porous support layer has conventional parameters with respect to pore diameter, porosity, and thickness. The fuel cells of the present invention preferably have excellent electrical properties and relatively low electrical resistance.

The present invention will be further clarified by the following examples which are intended to be purely exemplary of the present invention.

EXAMPLES

In all the tables, the quantities of monomer and seed particles are given in parts by weight, unless otherwise specified.

The compositions of the present invention were made using the following materials and reaction conditions:

Raw materials: The polyvinylidene fluoride (PVDF) seed latex used was a latex of a PVDF homopolymer seed latex prepared following the procedure set forth in U.S. Pat. No. 4,569,978, incorporated in its entirety by reference herein. The resin, when isolated from the latex, had a melt flow viscosity range at 230° C. of from 17 to 23 (Poise×10$^3$), determined by ASTM D3835 at 100 sec$^{-1}$ shear rate using 15/1:L/D capillary having 120° cone angle entrance, and a melt flow rate of 7 to 15 g/10 min at 232° C. determined by ASTM D1238. The monomers (Elf-Atochem, Aldrich), initiators (Aldrich, DuPont), surfactants (Aldrich) and buffers (Aldrich) were used without further purification. Procedure for acrylic/vinyl polymer prepared separately: in a I liter glass vessel, 500 g of water, 0.5 g of NaHCO$_3$, 4 g of ammonium lauryl sulfate 30 wt %, and 0.5 g of ammonium persulfate were introduced. After venting the reactor with nitrogen for 20 minutes, 50 g of a monomer mixture comprised of isobutyl methacrylate (5 g), methyl methacrylate (40 g), butyl acrylate (20 g), sulfopropyl methacrylate (35 g), and isooctyl mercaptopropionate (0.4 g) were charged into the reactor. After heating the reactor to 70° C. and then twenty minutes after reaching that temperature, the balance of monomer mix at a rate of 60 g/hr was fed into the reactor. The reaction was then carried out for 60 minutes prior to cooling the reactor. The reactor was then vented for 30 minutes with a nitrogen flow prior to filtering the latex. The isobutyl methacrylate, methylmethacrylate, and the butyl acrylate are also available from Elf Atochem under the Norsocryl® tradename.

Procedure Used in Preparing the Polymer Blend from Seeded Emulsion Polymerization:

Precharge, purge: Vazo 67 (CAS #13472-08-07, 2,2'-azobis (2-methylbutane-nitrile)) 0.3 g, sodium lauryl sulfate 1 g, and seed latex (PVDF, 28 wt % solids) 400 g, are precharged in a 500 ml four neck kettle fitted with a condenser, high purity argon and monomer inlets, and a mechanical stirrer. The pH of the mixture was adjusted to acidic conditions by adding few drops of diluted HNO$_3$ aqueous solution.

Reaction period: The reactor was heated up to 75° C. and the monomer mixture (Methyl Methacrylate (MMA) 46 g, and sulfopropyl methacrylate 3 g) was fed into the reactor at the desired rate using a syringe pump. Optionally a part of monomer mixture can be added in the precharge, prior to the reaction period. When the feeding was over, residual monomer was polymerized by maintaining the reaction temperature and agitation for 120 minutes. Then the medium was cooled to room temperature, vented, and the final latex was recovered. The final solids content was 35 wt %, with a coagulum-free latex.

Representative synthetic data of fluoropolymer resin containing sulfonated monomer are set forth in Table 1. The fluoropolymer seed resin to acrylic monomer ratio was of 70/30 wt %.

TABLE 1

| Ex. # | Acrylics (mol %) | | | | | | | solid Wt % |
|---|---|---|---|---|---|---|---|---|
| | MMA | BA | AM | SPM | SSA | VSA | DEGMA | |
| 1 | 55.1 | 32.4 | | 12.5 | | | | 31 |
| 2 | 53.6 | 31.5 | | 12.2 | | | 2.7 | 30 |
| 3 | 53.5 | 31.6 | | 12 | | | 2.9 | 27 |
| 4 | 31.3 | 31.6 | 21.8 | 12 | | | 2.9 | 25 |
| 5 | 54.8 | 32.1 | | 12.2 | | | 0.9 | 27 |
| 6 | 55.8 | 32.7 | | | 10.5 | | 1 | 30 |
| 7 | 35 | 15 | 12 | 35 | | | 3 | 34 |
| 8 | 28 | 4 | 4 | 63 | | | 1 | 26 |
| 9 | 52 | 31 | | | | 16 | 1 | |

BA = Butyl acrylate
AM = acrylamide
SPM = sulfopropylomethacrylate
SSA = styrene sulfonic acid
VSA = vinyl sulfonic acid
DEGMA = diethyleneglycolmethacrylate Description of Polymeric Ion Membrane Preparation from Solvent Cast.

~10 g of the polymer previously prepared (composition 70 wt % PVDF homopolymer and 30 wt % ionic polymer) were oven dried for at least 2 hours at 100° C. Then, the polymer was mixed with 50 g of Triethyl phosphate to give a clear viscous solution. The solution was cast onto a glass substrate using a blade of about 20 mils thickness. The solution was then baked at 140° C. for 60 minutes to yield a clear film of about 4–6 mils thick.

Description of Polymeric Ion Membrane Preparation from Latex Cast.

~0.15 g of Triton X405 30 wt % aqueous solution was added to 30 g of latex prepared by seeded polymerization (30 wt % solids) under constant stirring. Then 1.5 g of triethyl phosphate was added dropwise to the latex under constant stirring. The formulated latex was then allowed to rest for at least 3 hours prior to use. Using a 25 mils thickness blade, a film was cast onto a Q aluminum panel, and then baked at 220° C. for 10 minutes, yielding a uniform film of about 4 mils thick Water uptake (respectively methanol, or water/methanol mix) was measured as follows: the membrane was vacuum dried at 100° C. for at least 3 hours, weighed carefully, and then immersed in water (methanol, or water/methanol mix) for 350 hours. The film was then wiped and weighed again.

Methanol crossover was measured as follows: the membrane was placed between the 2 compartments of a plastic filter holder with receiver from Nalgene. In the upper compartment a 3M methanol in water solution was placed, while the bottom compartment, was filled with DI water. Samples were withdrawn on a regular basis from the bottom compartment and the methanol content was measured by gas chromatography.

Acid diffusion through the membrane was measured as follows: the membrane was place between the 2 compartments of the plastic filter holder with receiver from Nalgene. The upper compartment was filled with a 1M HCl aqueous solution, while the bottom compartment, was filled with DI water. Samples were withdrawn on a regular basis from the bottom compartment and the acid content was measured by pH titration.

TABLE 2

Representative data for water and methanol uptake, and methanol crossover.
5–10 mils films (100–250 μm)

| | Uptake[b] @ RT | | | Uptake[b] @ 60° C. MeOH/ H$_2$O | Uptake[b] @ 80° C. MeOH/ H$_2$O | MeOH crossover[c] | | Titration[d] g$_{pol}$/mole SO$_3$ |
|---|---|---|---|---|---|---|---|---|
| | H$_2$O | MeOH | H$_2$O/SO$_3$ | 3M | 3M | 45' | 24 h | Found |
| Nafion 117 | 0.175 | 0.359 | 201 | 0.313 | 0.381 | 0.15 | 9 | 1150 |
| Ex 2[a] | 0.017 | 0.037 | 1056 | 0.037 | 0.010 | 0 | 0.67 | 62170 |
| Ex 3 | 0.041 | 0.038 | 219 | 0.021 | 0.046 | 0 | 0.08 | 5350 |
| Ex 4 | 0.031 | 0.029 | 164 | 0.061 | 0.029 | 0 | 0.28 | 5270 |
| Ex 5 | 0.035 | 0.034 | 150 | 0.042 | 0.054 | 0 | 0.07 | 4270 |
| Ex 6 | 0.046 | 0.030 | 230 | 0.040 | 0.047 | 0 | 0 | 4990 |

[a]Compositions from Table 1
[b]g of fluid/g of polymer, after 350 hours treatment.
[c]Ambient temperature
[d]Titration of membrane + elemental analysis

TABLE 3

Representative data for proton diffusion.
Experiment: stock water solution is pH = 1.44. Stays constant throughout the experiment. Testing carried over 24 h time period.

| | Thickness (μm) | g$_{pol}$/mole SO$_3$ Found | Initial pH | Final pH | H$^+$ mole 10$^6$ | H$^+$/SO$_3^+$ × 10$^3$ | H$_2$O permeation (mL) |
|---|---|---|---|---|---|---|---|
| Nafion 117 ® | 190 | 1150 | 6.77 | 5.51 | 1.139 | 1.84 | ≈1.5 |
| Ex 2 | 170 | 62170 | 6.77 | 5.48 | 1.225 | 188.0 | None |
| Ex 3 | 90 | 5350 | 6.77 | 4.39 | 6.170 | 186.5 | None |
| Ex 4 | 60 | 5270 | 6.77 | 4.46 | 13.45 | 192.6 | ≈1.0 |
| Ex 5 | 190 | 6160 | 6.77 | 4.83 | 5.69 | 133.5 | None |
| Ex 6 | 80 | 3100 | 6.77 | 5.34 | 1.72 | 22.0 | None |

One can see from Tables 2 and 3 that the membranes of the present invention displayed a superior efficiency in terms of water and methanol uptake, as well as methanol crossover.

Moreover, one can see that despite a much lower sulfonated group number, that the proton transport efficiency was much higher in the present invention.

In this example, additional polymeric ion membranes were prepared using the fluoropolymers set forth in Table 4 below. These polymers were prepared using the techniques and materials described above, with the noted differences. The polymer blends were then solvent cast or latex cast as indicated. Water crossover was measured as well as conductivity. As can be seen in Table 5, films of the present invention having a thickness of 2–3 mils were all conductive (e.g., proton conductivity was obtained with the membranes of the present invention).

TABLE 4

| | Fluoropolymer | Acrylics (grams) | | | | |
|---|---|---|---|---|---|---|
| Examples | (grams) | IBMA | BA | MMA | SPM | AM |
| 10 | 120 | 3 | 7 | 12 | 50 | 8 |
| 11 | 120 | 3 | 6 | 52 | 50 | 8 |
| 12 | 120 | 3 | 6 | 52 | 50 | 8 |
| 13 | 174 | 4.6 | 15.3 | 15.3 | 31.5 | 4 |

TABLE 5

Conductivity results. All films are 2-mils thick

| Example # | Fluoropolymer type | Fluoropolymer/ Acrylic (weight %) | EW measured | Preparation[b] method | Water uptake[a] (wt %) | 4 probe in plane Conductivity[c] (mS/cm) |
|---|---|---|---|---|---|---|
| 10 | PVDF | 60/40 | 1000 | latex | 66 | 35 |
| 11 | PVDF | 50/50 | 1180 | solvent | 52 | 13 |
| 12 | PVDF | 50/50 | 1000 | solvent | 96 | 33 |

TABLE 5-continued

Conductivity results. All films are 2–mils thick

| Example # | Fluoropolymer type | Fluoropolymer/ Acrylic (weight %) | EW measured | Preparation[b] method | Water uptake[a] (wt %) | 4 probe in plane Conductivity[c] (mS/cm) |
|---|---|---|---|---|---|---|
| 13 | P(VDF-HFP) | 70/30 | 1000 | latex | 52 | 60 |
| Nafion ® 117[d] | — | — | 1100 | — | 20 | 75 |

[a]Water uptake (Weight %). Dry membrane is soaked in boiling water for 2 h then weighed carefully at 25° C. Water uptake is then given by: water uptake = 100* (wet weight − dry weight)/dry weight
[b]Latex cast film were prepared from formulated latex. Latex was formulated as follow:
To 50 g latex (25% solids), 1 g Triton X-405 were gently added. Then 2.5 g triethyl phosphate were added slowly under constant gentle stirring, then let sit for at least 60 minutes prior to application. Then the latex was filtered, cast and baked at 80° C. for 5–10 minutes and 220° C. for 10–15 minutes. Solvent cast film were prepared from dried powder dispersed into a solvent package (usually DMSO/water 90/10). The final dispersion had 20–30%solids. The dispersion was cast and baked at 220° C. for 15–20 minutes. All films were 2–3 mils thick.
[c]AC impedance measurements between $2 \cdot 10^5$ and 1 Hz were carried out with a Gamry Instrument (Potentiostat - Galvanostat - ZRA PC4/750 and Electrochemical Impedance Spectroscopy EIS300 software). A four probe configuration was employed and the values presented have been obtained at 25° C. and under 100% of relative humidity.
[d]Nafion ® film (7 mils thick) was purchased from Aldrich. Measurements done under the same conditions as above.

Other embodiments of the present invention will be apparent to those skilled in the art from consideration of the specification and practice of the present invention disclosed herein. It is intended that the specification and the examples be considered as exemplary only, with a true scope and spirit invention being indicated by the following claims.

What is claim is:

1. A polymer blend comprising:
    a) at least one acrylic resin or at least one acrylic resin and at least one vinyl resin, wherein said at least one acrylic resin or vinyl resin has at least one ionic or ionizable group, wherein said ionic or ionizable group is a sulfonated group or a phosphonated group or both; and
    b) at least one thermoplastic fluoropolymer, wherein a) and b) are different.
2. The polymer blend of claim 1, wherein said at least one thermoplastic fluoropolymer is a copolymer.
3. The polymer blend of claim 1, wherein said fluoropolymer comprises poly(vinylidene fluoride).
4. A polymer blend comprising:
    a) at least one acrylic or vinyl resin or both having at least one ionic or ionizable group; and
    b) at least one thermoplastic fluoropolymer, wherein a) and b) are different, wherein said fluoropolymer comprises a) poly(vinylidene fluoride) and b) hexafluoropropylene, tetrafluoroethylene, chlorotetrafluoroethylene, vinyl fluoride, or combinations thereof.
5. A polymer blend comprising:
    a) at least one acrylic or vinyl resin or both having at least one ionic or ionizable group; and
    b) at least one thermoplastic fluoropolymer, wherein a) and b) are different, wherein said fluoropolymer comprises a) from about 30 weight % to about 100 weight % of a poly(vinylidene fluoride) and from 0 weight % to about 70 weight % of at least one poly(alkylene) containing at least one fluorine atom.
6. The polymer blend of claim 4, wherein said ionic or ionizable group is a sulfonated group or a phosphonated group or both.
7. The polymer blend of claim 1, wherein said at least one thermoplastic fluoropolymer is a core and said at least one acrylic resin having at least one ionic or ionizable group partially coats said core.
8. The polymer blend of claim 1, wherein said at least one acrylic or vinyl resin or both having at least one ionic or ionizable group is formed by polymerizing at least one acrylic or vinyl or both containing monomer, at least one co-polymerizable monomer, at least one monomer having at least one functional group, and at least one monomer having ionic or ionizable groups, wherein each monomer is different from one another.
9. The polymer blend of claim 8, wherein said monomer having ionic or ionizable groups is a sulfonated or phosphonated monomer.
10. The polymer blend comprising:
    a) at least one acrylic or vinyl resin or both having at least one ionic or ionizable group; and
    b) at least one thermoplastic fluoropolymer, wherein a) and b) are different, wherein said acrylic resin or vinyl resin is fluorinated.
11. The polymer blend of claim 1, wherein said acrylic resin or vinyl resin is a copolymer.
12. A polymeric ion membrane comprising the polymer blend of claim 6.
13. A membrane comprising the composition of claim 1.

* * * * *